United States Patent [19]

Bellis

[11] 4,127,513
[45] Nov. 28, 1978

[54] METHOD FOR PREPARING POLYETHER GLYCOLS

[75] Inventor: Harold E. Bellis, Wilmington, Del.

[73] Assignee: E. I. Du Pont de Nemours and Company, Wilmington, Del.

[21] Appl. No.: 850,029

[22] Filed: Nov. 9, 1977

[51] Int. Cl.$^2$ .................... C08G 65/10; C08G 65/20
[52] U.S. Cl. .................................... 528/413; 528/417; 568/613
[58] Field of Search .................... 260/2 BP, 615 B

[56] References Cited

U.S. PATENT DOCUMENTS

| 3,201,197 | 8/1965 | Showalter | 23/112 |
| 3,328,467 | 6/1967 | Hamilton | 260/615 |
| 3,412,039 | 11/1968 | Miller | 252/428 |
| 3,997,563 | 12/1976 | Dale et al. | 260/338 |

Primary Examiner—Harold D. Anderson
Assistant Examiner—E. A. Nielsen

[57] ABSTRACT

The production of undesirable oligomeric cyclic ethers in the preparation of polyether glycols is reduced by using as a catalyst an acid-activated montmorillonite clay which contains, per gram, 0.1 to 0.9 milliequivalent of hydrogen ions having $pK_a$ values of $-3$ to $-8$.

5 Claims, No Drawings

METHOD FOR PREPARING POLYETHER GLYCOLS

BACKGROUND OF THE INVENTION

This invention relates to an improved method for preparing tetrahydrofuran/alkylene oxide copolymers having low oligomeric cyclic ether content.

In the copolymerization of tetrahydrofuran (THF) and alkylene oxides to produce polyether glycols it is customary to use an acid-activated montmorillonite clay as a catalyst. This is shown, for example, in British Pat. No. 854,958, where the montmorillonite clay is referred to as a "bleaching earth". A clay of this type has ordinarily been activated by bringing it into contact with an aqueous solution containing only about 10%, by weight, or less of mineral acid. This replaces most of the clay's exchangeable sodium ions with hydrogen ions, but leaves most of the clay's exchangeable potassium, magnesium and calcium ions unaffected. While the process of copolymerizing THF and alkylene oxides using an activated clay catalyst of this type is generally satisfactory, it has been observed that the process also produces oligomeric cyclic ether byproducts, which can constitute as much as 10% to 15%, by weight, of the total product.

These oligomeric cyclic ethers are undesirable for several reasons. First, they are impurities and represent "dead" material to the purchaser of the copolymer product in the sense that 10% to 15%, by weight, of the material he buys is not useful for his purposes.

Secondly, when the copolymer products are used in the preparation of polyurethanes, their prime utility, the oligomeric cyclic ethers tend to degrade the polyurethanes' properties.

Last, the oligomeric cyclic ether byproducts are quite soluble in common organic liquids and so many cause processing difficulties in whatever uses are made of the copolymer products.

SUMMARY OF THE INVENTION

It has now been found that the amounts of oligomeric cyclic ethers present in the THF/alkylene oxide copolymer products can be significantly reduced if the catalyst used in preparing the products is a montmorillonite clay which has been activated with an aqueous solution containing at least 15%, by weight, of acid, in contrast to solutions containing 10%, by weight, of acid or less, which have been used heretofore.

Montmorillonite clay activated by the more concentrated acid solution not only has most of its exchangeable sodium ions, but also most of its exchangeable potassium, magnesium and calcium ions replaced by hydrogen ions. Such a clay contains, per gram, 0.1 to 0.9 milliequivalent of hydrogen ions, preferably 0.2 to 0.6, having $pK_a$ values of $-3$ to $-8$, preferably $-5$ to $-8$.

Such clay catalysts are also more active than conventional acid-activated montmorillonite clay catalysts. This means a THF/alkylene oxide copolymerization reaction will proceed faster and more efficiently when the present catalysts are used than otherwise.

DETAILED DESCRIPTION OF THE INVENTION

Any montmorillonite clay having exchangeable sodium, potassium, calcium and magnesium ions can be used to prepare the catalysts. Preferred for its availability and low cost is a type of naturally occurring montmorillonite clay known as Wyoming bentonite. A clay of this type, Volclay ® bentonite, is sold by American Colloid Company of Skokie, Ill.

The acid used to activate the clay can be any mineral acid such as sulfuric, hydrochloric, phosphoric (all forms) or nitric. Sulfuric acid used by itself produces clays containing, per gram, 0.1 to 0.3 milliequivalent of hydrogen ions having $pK_a$ values stronger than $-3$. When sulfuric acid is used it may therefore be desirable that the clay also be brought into contact with at least one other concentrated acid solution. This treatment with another acid solution can be before or after the treatment with the sulfuric acid solution. The sequential use of sulfuric acid and hydrochloric acid is preferred.

Organic acids can also be used to activate the clay provided they have $pK_a$ values stronger than $-3$, preferably $-5$. Illustrative of such acids are toluenesulfonic acid, trifluoroacetic acid and trifluoromethane sulfonic acid.

The clay is activated by first preparing a solution of an aforementioned acid in water. The concentration of acid in this soluton should be at least 15%, by weight, but should not be so high that the solution, when used, will attack the clay's structure and degrade it. The concentration of acid at which this degradation begins varies with the type of clay used, but is generally about 60% to 65% by weight. Solutions having acid concentrations of about 15% to 40%, by weight, give the best results and are therefore preferred.

If the clay to be activated according to the invention is granular, this granular character can be preserved by mixing the acid solution to be used with enough THF to give an acid solution/THF weight ratio of about 1:1 to 1:4.

A column is then filled with the acid solution and to this solution is added about an equal weight of raw clay. The clay settles quickly, and the acid solution is then slowly withdrawn from the bottom of the column at a constant rate. If necessary, fresh acid solution can be added at the top of the column, continuously if desired.

The percolation process just described is preferably conducted at a temperature of about 20° to 25° C., although it can be conducted at lower or higher temperatures, the only requirement being that the acid solution be kept in a liquid state.

The percolation is continued until the effluent contains a minimum of the ions which have been removed from the clay, as determined by spectrographic analysis. The clay is then rinsed free of acid solution, preferably with a 1:1 to 1:4 by volume mixture of water and THF, followed by an optional rinse with THF. The clay is then dried, as for example in an oven at 80° C. and a pressure of 20 mm of mercury for 12 to 14 hours, and is preferably screened to $-40$ mesh $+80$ mesh (U.S. sieve), and is then ready for use.

The clay catalysts thus obtained, as previously mentioned, contain, per gram, 0.1 to 0.9 milliequivalent of hydrogen ions having $pK_a$ values of $-3$ to $-8$, as determined by the method described by K. Tanabe in "Solid Acids and Bases, Their Catalytic Properties", Kodansha, Tokyo, 1970.

The clay catalysts thus produced are used in the polymerization of THF and alkylene oxides of 2 to 6 carbon atoms. In particlar, the catalysts can be used in place of and at the same concentrations as those customarily employed in the copolymerization of ethylene oxide or propylene oxide and THF, as described in British Pat.

No. 854,958, which is incorporated into this application by reference to show how such polymerizations are conducted.

EXAMPLES

In the following examples, all parts and percentages are by weight unless indicated otherwise.

EXAMPLE 1

A column 50 cm long with an inside diameter of 5 cm, and equipped with a drain and stopcock, was charged with a mixture of 80 ml of sulfuric acid (40% in water) and 120 ml of THF at 22° C. One hundred grams of Volclay ® were then added to the column.

After the clay had settled to the bottom of the column, the stopcock was opened and the acid/THF solution was allowed to drain from the column at the rate of one liter per hour. When the 200 ml charge of acid/THF mixture had passed through the column, another 200 ml portion of the same composition at 22° C. was passed through in the same fashion, followed by two 200 ml portions of a mixture of 80 ml of hydrochloric acid (38% in water) and 120 ml of THF. The clay was then rinsed with a mixture of 40% water and 60% THF until the effluent had a pH of 7.

The clay was rinsed with THF and dried in an oven at 80° C. under a vacuum of 24 mm of mercury.

The resulting clay contained, per gram, 0.55 milliequivalent of hydrogen ions having $pK_a$ values of $-3$ to $-8$.

EXAMPLE 2

Into a reaction vessel was charged a mixture of

| | | |
|---|---|---|
| Ethylene oxide | 44 g | |
| THF | 156 g | |
| Water | 2 g | |

This mixture (A) was heated to 52° to 58° C., with stirring, and to it was added 12 g of the catalyst of Example 1. The mixture was held at 52° to 58° C., with stirring, while 5 ml per minute of a mixture of the same composition as (A) was continuously added to the vessel, while product was continuously withdrawn at the same rate from the bottom of the vessel, to give a residence time of the mixture in the reactor of about 60 minutes.

The product was an ethylene oxide/THF copolymer glycol whose respective monomer unit mole ratio was 48/52. The product contained 7.1% of oligomeric cyclic ethers. Oligomeric cyclic ether content was determined by temperature programmed gas chromatography from 70° to 300° C. at 30° per minute, using "Chromosorb G" as a stationary phase and 5%, by weight of the Chromosorb, of OV-101 as the liquid phase. "Chromosorb G" is a diatomaceous earth and OV-101 is a methyl silicone; both are sold by the Perkin-Elmer Co.

I claim:

1. In a process for preparing a polyether glycol by the copolymerization of tetrahydrofuran and an alkylene oxide of 2 to 6 carbon atoms, in which an acid-activated montmorillonite clay is used as a catalyst, the improvement of using a clay which contains, per gram, 0.1 to 0.9 milliequivalent of hydrogen ions having $pK_a$ values of $-3$ to $-8$.

2. The process of claim 1 in which the alkylene oxide is ethylene oxide.

3. The process of claim 1 in which the alkylene oxide is propylene oxide.

4. The process of claim 1 in which the clay contains, per gram, 0.2 to 0.6 milliequivalent of hydrogen ions having $pK_a$ values of $-5$ to $-8$.

5. In a process for preparing a polyether glycol by the copolymerization of tetrahydrofuran and ethylene oxide using an acid activated montmorillonite clay as a catalyst, the improvement of using Wyoming bentonite which contains, per gram, 0.2 to 0.6 milliequivalent of hydrogen ions having $pK_a$ values of $-5$ to $-8$.

* * * * *